(12) United States Patent
Sammut

(10) Patent No.: US 10,602,655 B2
(45) Date of Patent: Mar. 31, 2020

(54) SOD HARVESTER

(71) Applicant: Daniel Sammut, New South Wales (AU)

(72) Inventor: Daniel Sammut, New South Wales (AU)

(73) Assignee: TRE BRO HODING, INC., Billings, MT (US)

( * ) Notice: Subject to any disclaimer, the term of this patent is extended or adjusted under 35 U.S.C. 154(b) by 581 days.

(21) Appl. No.: 14/757,604

(22) Filed: Dec. 23, 2015

(65) Prior Publication Data
US 2017/0181369 A1   Jun. 29, 2017

(51) Int. Cl.
  *A01G 20/12*  (2018.01)
  *A01B 76/00*  (2006.01)
  *A01G 20/15*  (2018.01)

(52) U.S. Cl.
  CPC .............. *A01B 76/00* (2013.01); *A01G 20/12* (2018.02); *A01G 20/15* (2018.02)

(58) Field of Classification Search
  CPC ................................ A01G 20/15; A01G 20/12
  USPC .......................................................... 172/19
  See application file for complete search history.

(56) References Cited

U.S. PATENT DOCUMENTS

| | | | | |
|---|---|---|---|---|
| 3,464,641 A | * | 9/1969 | Brouwer | A01G 20/12 242/535.1 |
| 3,485,304 A | * | 12/1969 | Daymon | A01G 20/12 172/19 |
| 3,664,432 A | * | 5/1972 | Nunes, Jr. | A01G 20/15 172/19 |
| 5,217,078 A | * | 6/1993 | Zinn | A01G 20/15 172/19 |
| 5,230,602 A | * | 7/1993 | Schouten | A01G 20/15 414/789.7 |
| 5,269,379 A | * | 12/1993 | Millar | A01G 20/15 172/19 |
| 5,775,436 A | * | 7/1998 | Noyes, II | A01G 20/15 172/20 |
| 6,296,063 B1 | | 10/2001 | Tvetene et al. | 172/19 |
| 6,364,027 B1 | | 4/2002 | Tvetene et al. | 172/1 |
| 6,659,189 B2 | * | 12/2003 | Woerner | A01G 20/15 172/20 |
| 6,681,864 B2 | | 1/2004 | Tvetene et al. | 172/20 |
| 6,779,610 B2 | * | 8/2004 | Brouwer et al. | A01G 20/15 172/20 |
| 6,783,318 B2 | | 8/2004 | Tvetene et al. | 414/789.7 |
| 7,000,706 B1 | * | 2/2006 | Dover | A01G 20/12 172/19 |
| 7,641,437 B1 | | 1/2010 | Tvetene et al. | 414/794.3 |
| 7,740,083 B2 | | 6/2010 | Tvetene | 172/20 |
| 8,118,154 B2 | | 2/2012 | Tvetene et al. | 198/468.8 |
| 8,813,861 B2 | * | 8/2014 | Stefanski | A01B 45/04 172/19 |
| 8,888,154 B2 | | 11/2014 | Tvetene | 296/61 |

* cited by examiner

*Primary Examiner* — Thomas B Will
*Assistant Examiner* — Joel F. Mitchell
(74) *Attorney, Agent, or Firm* — Johnson & Phung LLC

(57) ABSTRACT

A sod harvester for cutting a sod slab from a sod field and directing an unspoiled sod slab into a first carrier and a spoiled sod slab into a scrap sod carrier where the spoiled sod slab may be either discharged away from a path of the sod harvester or carried on the scrap sod carrier for later discharge from the scrap sod carrier.

28 Claims, 8 Drawing Sheets

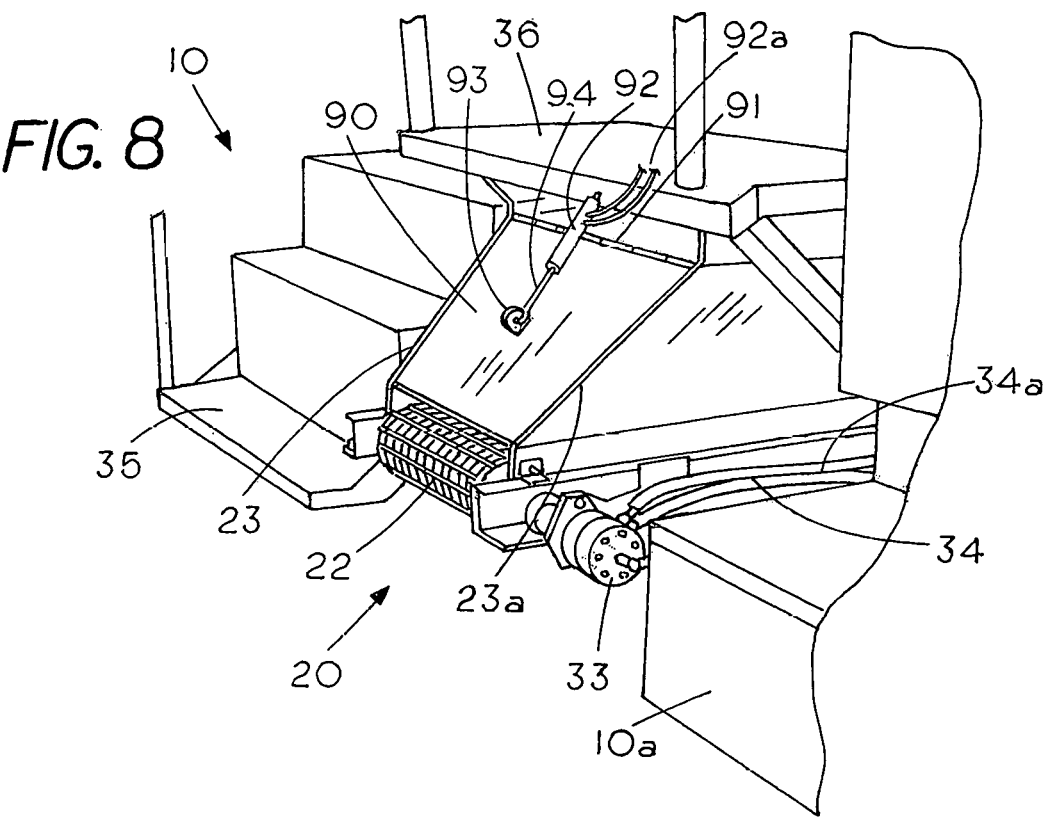
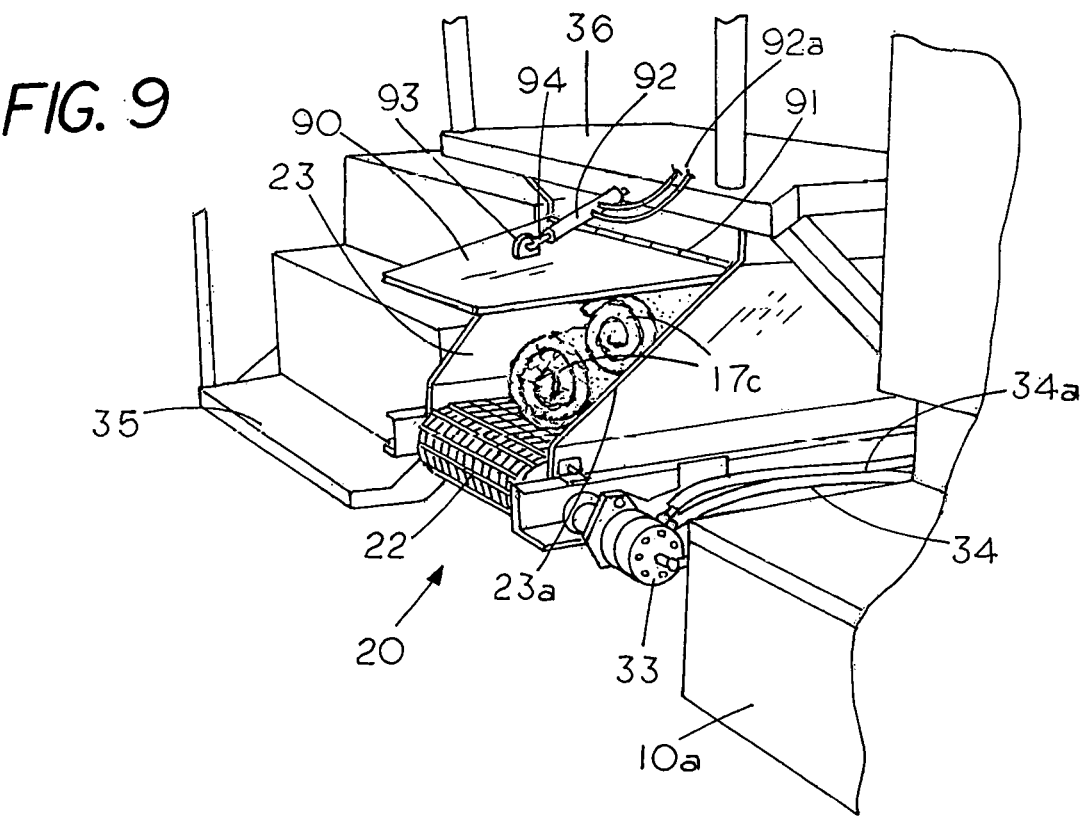

SOD HARVESTER

CROSS REFERENCE TO RELATED APPLICATIONS

None

STATEMENT REGARDING FEDERALLY SPONSORED RESEARCH OR DEVELOPMENT

None

REFERENCE TO A MICROFICHE APPENDIX

None

BACKGROUND OF THE INVENTION

The concept of on the go sod harvesters that can in a continuous operation cut a sod slab from a sod field and stack the cut sod slabs on a pallet, which can then be transferred to a work site by another vehicle, are known in the art. Typically, the sod harvester includes a set of knives that cut a flat sod slab from the sod field. The sod slab, which may be formed into a sod roll, is typically elevated upward from the sod field on a conveyor that discharges the sod roll onto a sod transfer mechanism. The sod roll is subsequently transferred to a sod pallet for further handling. The sod pallet with a stack of sod rolls thereon can then be transferred to a work site where the sod rolls are removed from the pallet and applied to the field. Examples of sod harvester for on the go harvesting are shown in Tvetene et al. U.S. Pat. Nos. 6,296,063; 6,783,318 and 6,364,027.

Occasionally, during the sod harvesting process a sod slab may be considered spoiled since the sod slab is unsuitable for use in sodding operations. When an operator encounters such a spoiled sod slab the operator may simply discard the spoiled sod slab by allowing the spoiled sod slab to fall to the sod field beneath the sod harvester. In some cases the sod slab may break up when it falls to the ground and in other cases the sod slab may remain intact. In either case the spoiled sod slab should be removed from the sod field at a later time.

If a sod slab breaks up when falling to the ground it becomes more time consuming to remove the spoiled sod slab from the sod field since the sod slab may scatter over a wide area. In addition a spoiled sod slab may also be run over by a wheel on the sod harvester, which causes further deterioration of the sod slab. Unfortunately, from time to time the presence of a spoiled flat sod slab or a spoiled sod roll, which has been run over by the sod harvester in an earlier pass, may also hinder the operation of the sod harvester during a subsequent pass. Eventually, the spoiled sod slabs should be removed from the sod field before the sod field can be replanted for the next sod crop.

The method of simply dropping a spoiled sod slab on the sod field beneath the sod harvester during the sod harvesting process has the advantage of producing a faster sod harvesting operation since spoiled sod slabs can be ejected on the go and without interrupting the sod harvesting operation. However, the in situ dropping of a spoiled sod slab may have the disadvantage of making it more difficulty and time consuming to subsequently remove the spoiled sod slab from the sod field since the spoiled sod slab in the form of either a flat sod slab or a sod roll may not remain intact when it falls to the sod field thus requiring greater effort to remove the spoiled sod slab or pieces of the sod slab from the sod field.

SUMMARY OF THE INVENTION

A sod harvester having a scrap sod carrier and a sod conveyor that in one mode delivers unspoiled sod slabs to a transport mechanism for subsequent stacking and in an alternate mode delivers spoiled sod slabs, which may be a flat sod slab or a sod roll, to the scrap sod carrier on the sod harvester. The scrap sod carrier may be operated continually to continually transfer scrap sod to an out of the way position on the opposite side of the harvester or alternately the scrap sod carrier may be used to capture and retain spoiled sod slabs, which eliminates the scattering of spoiled sod slabs on the sod field since the scrap sod carrier can carry a number of spoiled sod slabs for discharge at a later time. In addition the scrap sod carrier may lessen breakup forces on the spoiled sod slabs, which may lessen clean up, since the scrap sod carrier captures the spoiled sod slabs before the spoiled sod slabs can fall to the earth and be run over by the wheels of the sod harvester. Capturing the spoiled sod slabs before they fall onto the sod field also eliminates the opportunity for the spoiled sod slabs to interfere with the harvesting operation of the sod harvester.

BRIEF DESCRIPTION OF THE DRAWINGS

FIG. 8 shows an isolated partial left side view of an example of the a scrap sod carrier with a pivotal sod gate preventing discharge of scrap sod from the scrap sod carrier;

FIG. 9 is an isolated partial left side view of the pivotal sod gate of FIG. 8 in an open condition as the scrap sod carrier dumps scrap sod into a pile next to the sod harvester;

DESCRIPTION OF THE PREFERRED EMBODIMENT

Figure 1:
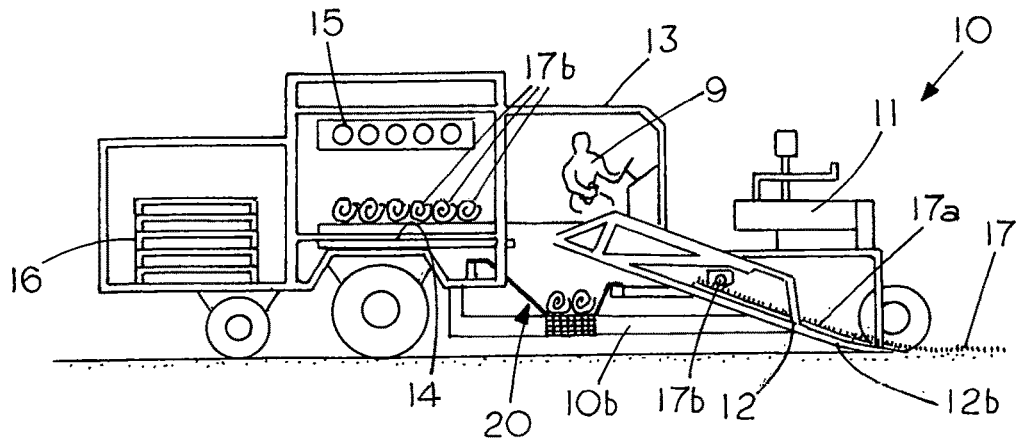
FIG. 1 is a right side view of a sod harvester with a scrap sod carrier located beneath a sod conveyor.

FIG. 1 is a right side view of a wheeled, self-propelled sod harvester 10 having a motor 11 that propels the sod harvester as well as a sod handling mechanism within the sod harvester. Examples of sod harvesters our shown in Tvetene et al U.S. Pat. Nos. 6,296,063; 6,783,318 and 6,364,027, which are hereby incorporated by reference.

Figure 2:
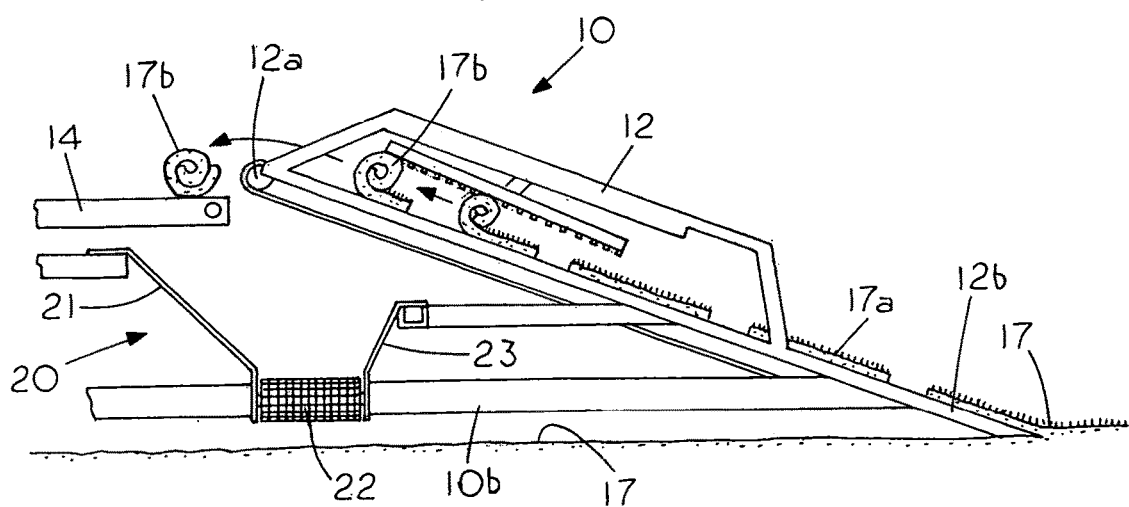
FIG. 2 is an isolated view of the sod harvester conveyor and scrap sod carrier of FIG. 1 with the sod conveyor carrier delivering an unspoiled sod roll to a sod transport mechanism.

The sod harvester 10 includes an operator station 13 with an operator 9 located therein. The right front side of the sod harvester includes an elevating sod conveyer 12 with a sod cutting mechanism 12b including a knife at the lower end for separating a sod slab 17a from the sod field 17. In a first mode the conveyor 12 elevates the cut slab of sod 17a and forms it into a sod roll 17b, which is delivered to a sod transport mechanism 14 (FIG. 2). A pick up mechanism 15 (FIG. 1) on sod harvester 10 transfers the sod rolls 17b to one of the pallets 16 carried by the sod harvester. The pallet with the sod rolls 17b are subsequently transferred to a work site.

Figure 3:
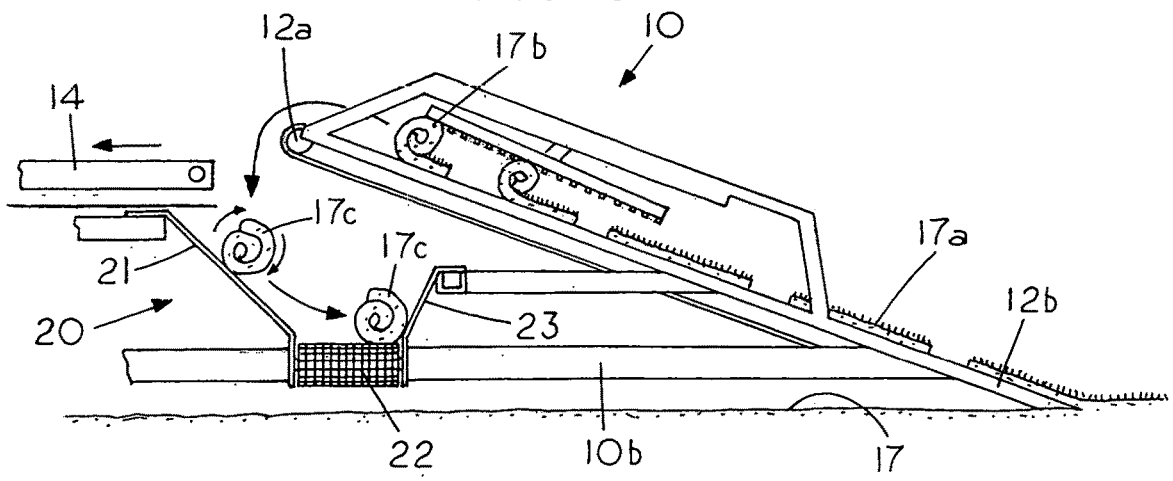
FIG. 3 is an isolated view of the sod harvester conveyor of FIG. 1 with the sod conveyor delivering a spoiled sod roll to a scrap sod carrier.

In the second mode, which is shown in FIG. 3, the sod harvester 10 delivers a spoiled sod slab 17c to an internal scrap sod carrier 20 that extends from side to side of the sod harvester 10. The scrap sod carrier 20 captures the spoiled sod slab 17c before the spoiled sod slab can fall to the sod field 17. The spoiled sod slabs in the scrap sod carrier 20 may be dumped on the field at a side of the harvester where they do not interfere with the operation of the sod harvester or the spoiled sod slabs may be allowed to accumulate on the scrap sod carrier and dumped at a later time. As illustrated in the drawings the scrap sod carrier 20 is located between and within the frame 10a and 10b of the sod harvester as the scrap sod carrier extends laterally from side to side of the sod harvester.

In the example shown the scrap sod carrier 20 is used to capture rolled sod slabs 17c. In this example a sod deflector or bang board 21 may be used to break the free fall of the spoiled sod roll 17c and limit damage to the spoiled sod roll as the deflector directs the spoiled sod roll into the scrap sod carrier 20. The scrap sod carrier, which is located below a discharge end of the sod conveyor 12, includes a scrap sod conveyer belt 22 extending transversely to the direction of motion of the sod harvester 10. The activation of the scrap sod conveyor belt 22 transfers the spoiled sod rolls from one side of the harvester to the opposite side of the harvester where the spoiled sod rolls are ejected laterally away from the sod harvester to a location where the spoiled sod rolls will not interfere with the forward motion of the sod harvester or with subsequent passes of the sod harvester. Alternately, the spoiled sod rolls may be accumulated and carried on the scrap sod carrier and subsequently dumped at a selected location thus avoiding spoiled sod rolls scattered about the sod field.

FIG. 2 is a partial right side view of the sod harvester 10 showing the operation of the sod harvester in a first conventional mode as the conveyor 12 directs an unspoiled sod roll 17b, which has been formed on conveyor 12, onto a displaceable sod transfer member 14, which may be a further conveyor. The sod transfer mechanism 14 is located proximate an upper discharge end 12a of conveyor 12 so that the impetus to the sod roll 17b discharging from the sod conveyor 12 as well as the gravitational forces acting on sod roll 17b directs the sod roll 17b onto the sod transfer mechanism 14 where the sod roll 17b can be further processed and stacked on pallets for delivery to a work site.

FIG. 3 is a partial right side view of the sod harvester 10 showing the sod harvester 10 in a second mode. In the second mode operator 9 moves the sod transfer mechanism 14 away from the upper discharge end 12a of the conveyor 12 allowing a spoiled sod roll 17c on conveyor 12 to fall past the end of the sod transfer mechanism 14 and into a scrap sod carrier 20, which is located below the conveyor 12.

Normally, scrap sod rolls are allowed to fall to the earth beneath the sod harvester. However, in the invention described herein, the scrap sod carrier 20 captures the spoiled sod slab 17c preventing the spoiled sod roll 17c from falling to the earth and being run over by the sod harvester 10, which causing further deterioration of the sod roll making it more difficult and time consuming to remove the spoiled sod roll from the sod field. In addition, in some cases the spoiled sod roll on the field may interfere with the smooth operation of the sod harvester. A feature of the present invention is that although spoiled sod rolls are of little salvage value the preservation and field capture of spoiled sod rolls before they can fall under the sod harvester not only reduces clean up time of spoiled sod rolls but it also prevents spoiled sod rolls from interfering with the smooth operation of the sod harvester.

FIG. 3 shows that in the second mode the spoiled sod roll 17c falls onto a deflector plate or bang board 21 that extends at an acute angle to the horizon. The bang board funnels or directs the spoiled sod roll 17c downward toward a laterally extending scrap sod conveyer 22. An upward extending side wall 23 prevents the sod roll 17c from rolling out of the scrap sod carrier 20 as it rolls down the bang board 21.

FIG. 3 also illustrates that after hitting the bang board 21 the spoiled sod roll 17c rolls down bang board 21 and onto an open link scrap sod conveyor belt 22 thus maintaining the integrity of the spoiled sod roll 17c since the spoiled sod roll 17 falls only partway to earth as the bang board 21 breaks the free fall of the sod roll, which reduces impact forces that can tear apart the sod roll 17c. Note, that once the spoiled sod roll 17c hits the bang board 21 it starts rolling in a clockwise direction, which prevents unwinding of the sod roll, so that the sod roll 17c remains intact as it rolls into the open link conveyor belt 22 in the bottom of the laterally extending scrap sod carrier 20.

As can be seen in FIG. 3 the bang board 21 not only reduces the impact forces on the sod roll 17c since the sod roll 17c is captured before the sod roll can fall to the earth but it also helps maintain the sod roll 17c in a wound condition as the sod roll 17c is delivered to the scrap sod conveyor belt 22. Although most scrap sod rolls 17c are discarded and therefore the condition of the sod roll 17c may not be important from a stand point of salvage, however, in the invention described herein it has been found that the maintenance of the integrity of the scrap sod rolls 17c until the sod roll can be properly recycled has been found to not only reduce time-consuming field cleanup of the spoiled sod rolls but also prevent spoiled sod rolls on the sod field from hindering the harvesting of unspoiled sod rolls from the sod field.

Figure 4:
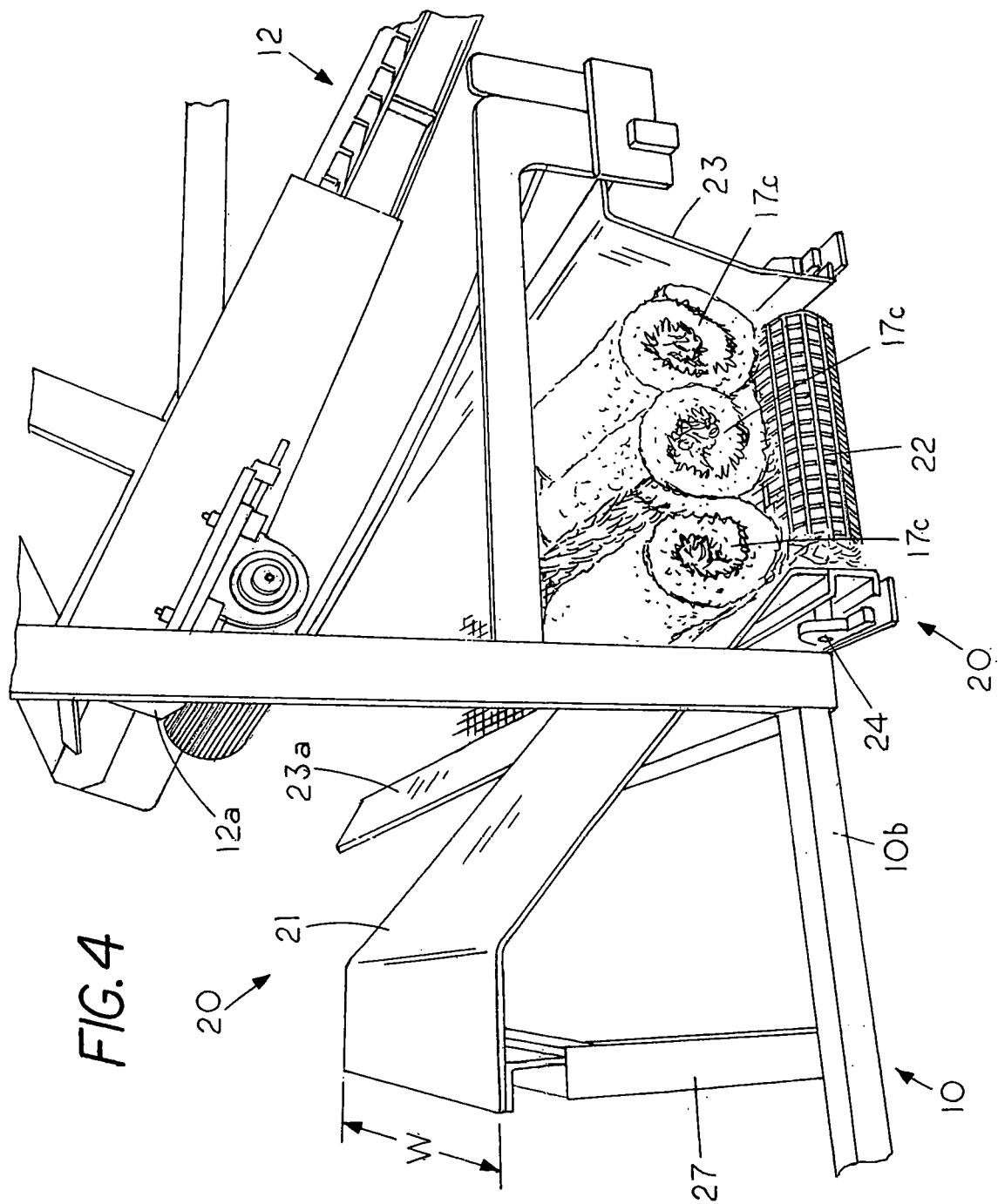
FIG. 4 is an isolated and perspective right side view of the scrap sod carrier with three rolls of spoiled sods thereon.

FIG. 4 shows an isolated perspective view of the sod conveyor 12 and the right end of scrap sod carrier 20 revealing the sod conveyor 12 having a discharge end 12a that is located above bang board 21, which is supported by frame 27 of sod harvester 10. As can be seen in FIG. 4 the bang board 21 and side wall 23a form one side wall of scrap sod carrier 20 and sidewall 23 forms an opposite sidewall to form a sod slab trough therebetween. The trough allows multiple sod rolls 17c to accumulate on the open chain conveyor belt 22, which is rotatably supported on one end by a shaft 24 and on the opposite end by a second shaft (not shown), which extends from side to side of the scrap sod carrier 20.

The bang board 21, which is located on the right side of the sod harvester 10, has a width W that is preferably wider than a sod roll 17c to provide a support surface for a falling sod slab roll 17c as the sod roll falls thereon and begins rolling onto the scrap sod conveyor 22 that extends from the right side 10*b* of the harvester 10 to the left side 10*a* of the sod harvester 10.

Figure 5:
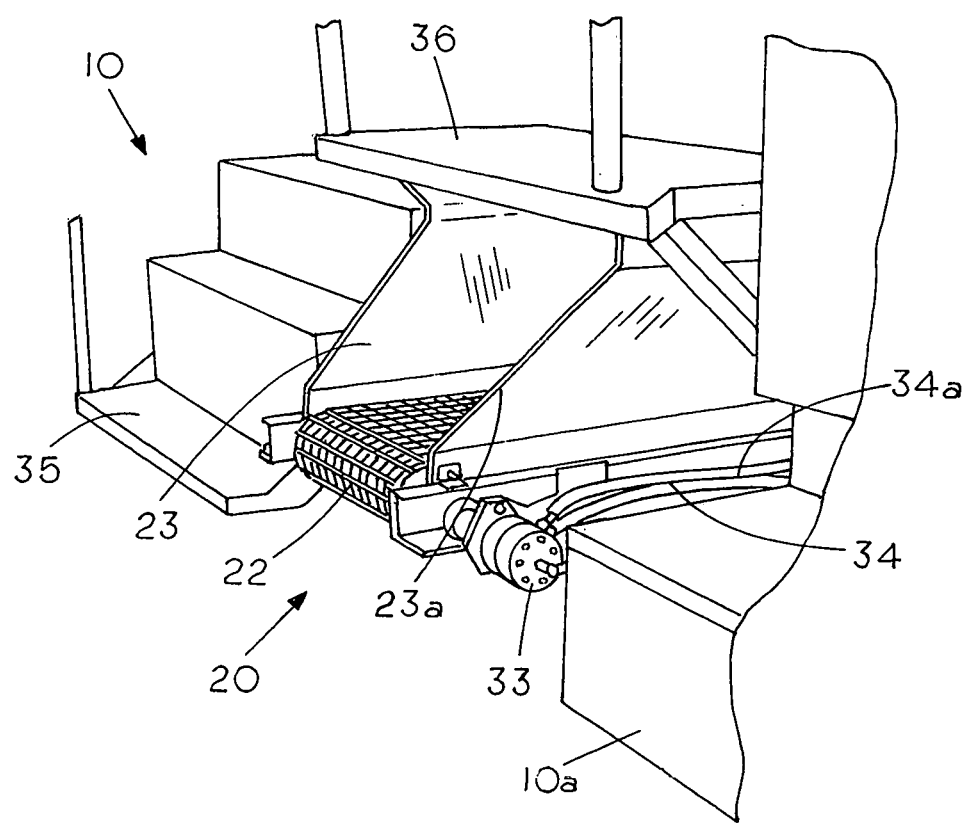
FIG. 5 shows an isolated partial left side view of the a discharge end of the scrap sod carrier.

FIG. 5 is an isolated perspective left side view of the sod harvester 10 revealing the discharge end of the scrap sod carrier 20 with the conveyor sidewall 23*a* and conveyor sidewall 23 forming a trough to hold spoiled sod slab rolls therebetween. Scrap sod carrier 20, which is supported by sod harvester 10, extends from the right side 10*b* of the sod harvester 10 to the left side 10*a* of the harvester, which enables chain conveyor belt 22 to transfer a scrap sod roll 17*c* from the harvesting side 10*b* of the sod harvester 10 to the opposite side of the harvester 10*a* where the scrap sod conveyor belt 22 ejects the sod roll 17*c* laterally outward away from the sod harvester.

The left side of sod harvester 10 includes a set of steps 35 and a platform 36 for an operator to mount the sod harvester and enter operator station 13 (FIG. 1). The sod harvester controls (not shown) as well as the hydraulic controls for the scrap sod carrier 20 are located in operator station 13. In this example the scrap sod carrier conveyor belt 22 comprises an open link chain belt, which is powered through a hydraulic motor 33 that can be controlled from operate station 13 through a set of hydraulic lines 34 and 34*a*. Although other types of conveyors may be used a link chain belt conveyor has the advantage of mechanically and frictionally engaging a sod roll as well as allowing any loose soil to fall through the spaces between the links in the ling chain conveyor belt.

A feature of the scrap sod carrier 20 and the hydraulic motor 33 is that the scrap sod carrier 20 may be operated independently of the sod harvesting action of the sod harvester 10. That is, in one mode the scrap sod conveyer belt 22 may run continually to transfer spoiled sod rolls from one side of the harvester to the opposite side of the sod harvester 10 where the spoiled sod roll can be dumped proximate the side 10*a* of the sod harvester 10. In a second mode the scrap sod carrier conveyor belt 22 can be advanced partially so that any sod slab rolls 17*c* thereon are moved toward the ejection side 10*a* of the scrap sod harvester. Once stopped further scrap sod can be accumulated on the scrap sod carrier 20. The advantage of a periodic rotation of scrap sod conveyor belt 22 is the scrap sod carrier 20 can be used to accumulate multiple spoiled sod rolls 17*c*, which are held in a side-to-side condition and an end-to-end condition on the scrap sod conveyor belt 22. The operator can activate the scrap sod conveyor belt 22 by supping power to hydraulic motor 33 through hydraulic lines 34 and 34*a* to eject all the scrap sod rolls 17*c* in the scrap sod carrier 20 at one site thus making it easier for field clean up of the spoiled sod slab rolls since the spoiled sod rolls are not scattered over the field.

Figure 6:
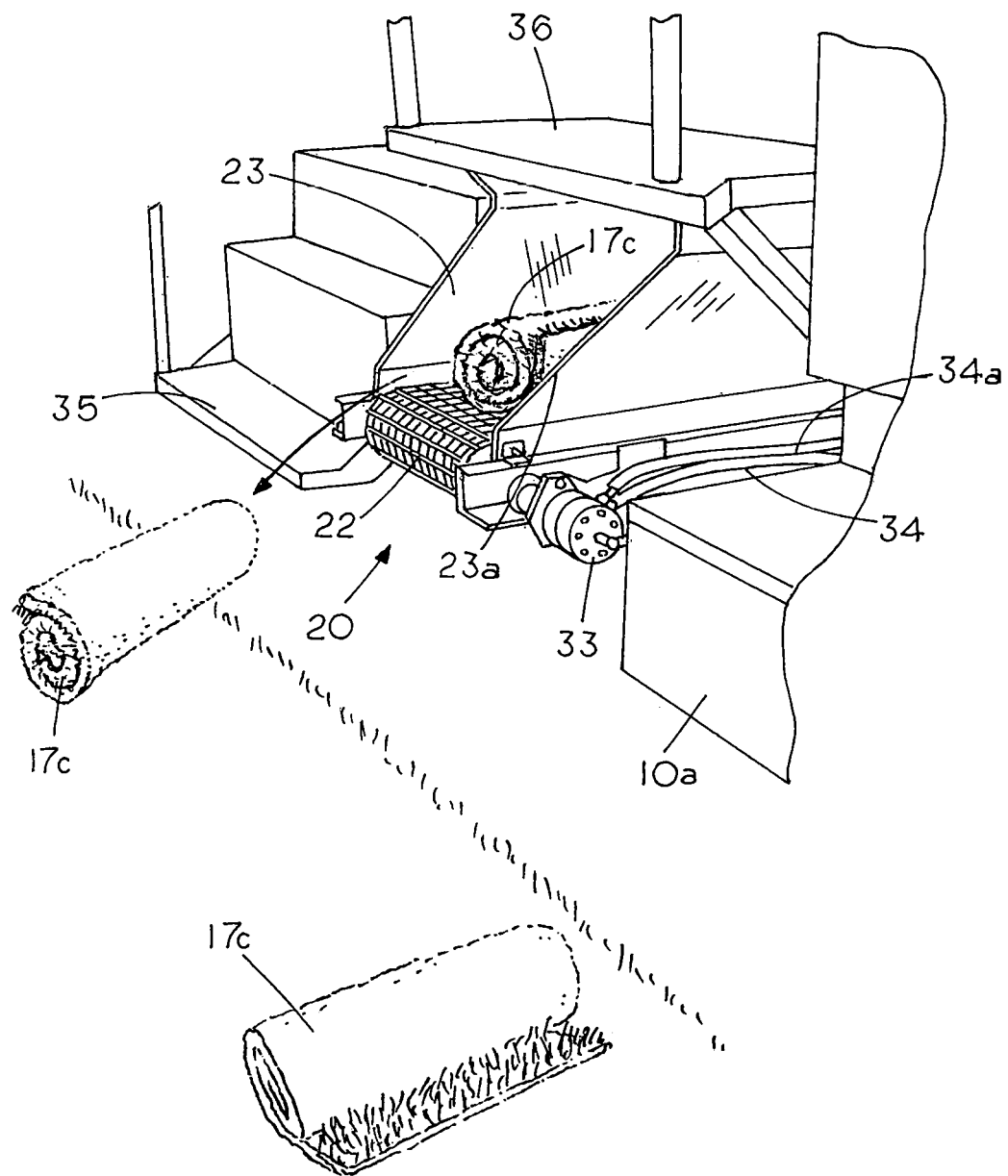
FIG. 6 shows a spoiled sod slab ejected from scrap sod carrier without disintegration of the spoiled sod slab.

FIG. 6 is a left side view showing the discharge of a scrap sod roll 17*c* from the sod carrier 20 with two spoiled sod rolls 17*c* already having being discharged from the sod carrier 20 and a third spoiled sod roll 17*c* about to be discharged to a location proximate the left side 10*a* of the sod harvester 10.

Figure 7:
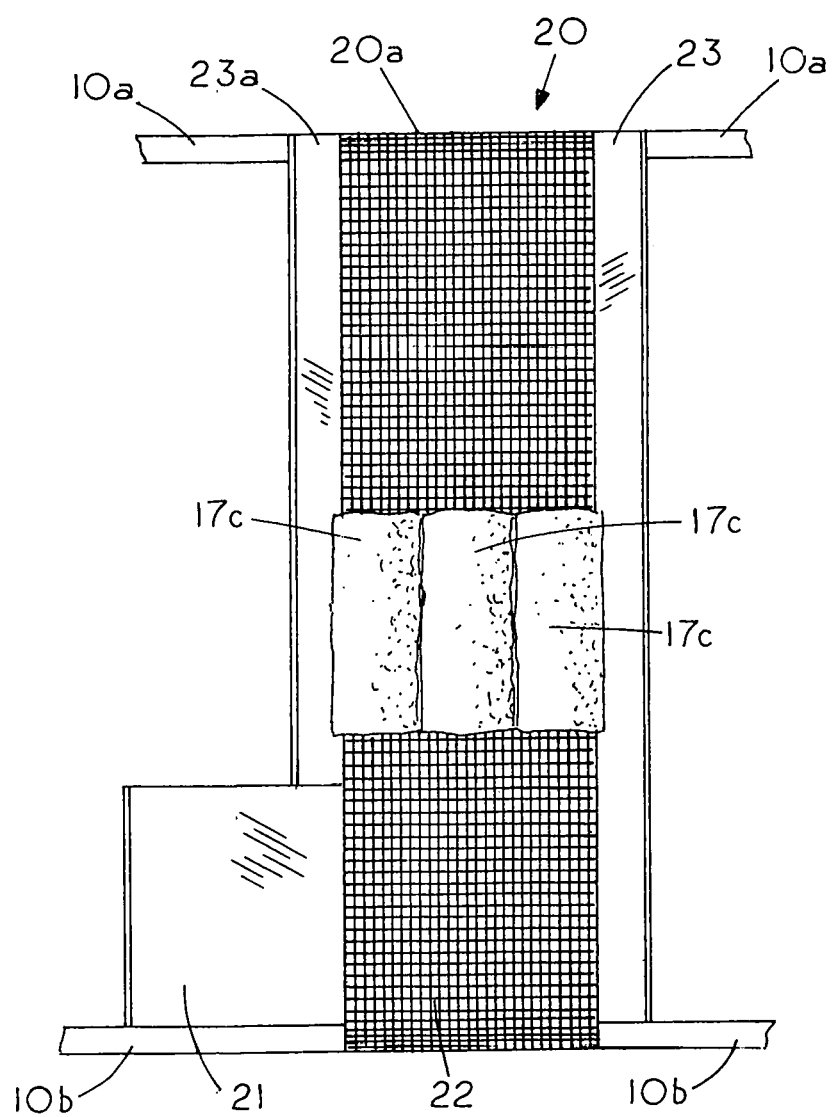
FIG. 7 is an isolated top view of the scrap sod carrier that extends from side to side of the sod harvester.

FIG. 7 is a top isolated view of the scrap sod carrier 20 showing that the scrap sod carrier 20 extends from the right side 10*b* of the sod harvester, where it receives a spoiled sod roll 17*c*, to the left side 10*a* of the sod harvester, where it discharges the spoiled sod roll 17*c* alongside the sod harvester while the sod harvester is either stationary or harvesting sod. The bang board 21, which is located on the right or harvesting side of sod harvester 10, extends rearward in the sod harvester 10 so as to be in sod fall alignment with the conveyor 12 as illustrated in FIG. 3. Sidewall 23 and 23*a*, which extend alongside chain link conveyer belt 22, maintain the sod rolls 17*c* on the chain link conveyor belt 22 as the sod roils 17*c* are transported from the right side 10*b* of the harvester, where the sod is cut, to the opposite side of the harvester 10, where the scrap sod rolls are ejected onto the sod field. In the example shown a chain link conveyor belt 22 supports and delivers the spoiled sod rolls since the chain link conveyor belt 22 has the advantage of allowing loose soil to fall through the conveyor belt 22 while the links in the conveyor belt 22 frictionally and mechanically engage the sod rolls 17*c* on the conveyor belt 22 to carry the sod rolls 17*c* from one side of the harvester to the other side. To prevent clogging of the sod slab carrier 20 the sidewalls 23 and 23*a* comprise smooth, flat, low friction surfaces so that if the sod rolls 17*c* contact the sidewalls the sod rolls slide along the sidewalls as the conveyor belt 22, which is underneath the sod rolls 18*c*, pulls the sod rolls 17*c* to a discharge end 20*a* of the sod slab carrier 20.

FIG. 8 shows the discharge end of the scrap sod carrier 20 with a sod gate 90 pivotally attached thereto. An elongated hinge 91 connects the top of sod gate to the sod harvester platform 36 with a two way hydraulic cylinder 92 having one end connected to sod harvester platform 36 and the extendable shaft 94 of hydraulic o connected to an extension 93 secured to the top of sod gate 90. A pair of hydraulic hoses 92 allows one to extend or contract shaft 94 to close or open sod gate 90.

As shown in FIG. 8 the sod gate 90, which is in the closed condition, extends across the open end of the sod scrap carrier 20 preventing ejection of scrap sod even though the conveyer belt 22 may still be rotating. In operation as the conveyor belt 22 continues to rotate it carries scrap sod toward the discharge end of the sod scrap conveyor until the scrap sod encounter the sod gate 90, which stops movement of the scarp sod. However, by having conveyor belt 22 continue to rotate underneath the scrap sod held by the sod gate 90 the belt can carry additional scrap sod 17*c* to the discharge end of the sod scrap carrier where it accumulates behind the sod gate. In this mode of operation the conveyor belt 22 should run continually and generate sufficient friction with the scrap sod to carry the scrap sod therein to the discharge end of the scrap sod carrier but at the same time allow the conveyor belt 22 to slide beneath the scrap sod 17*c* on the conveyor belt when the scrap sod encounters the closed sod gate 90 as shown in FIG. 8. This feature allows one to continue to bring additional scrap sod on the conveyor belt 22 toward the field discharge end of the scrap sod carrier for discharge at a later time.

FIG. 9 shows the sod gate 90, which is pivoted upward on elongated hinge 91, in the open condition through a retraction of hydraulic shaft 94 on hydraulic cylinder 92. In the open condition scrap sod 17*c* and any additional scrap sod 17*c* located on the conveyor belt 22 can be dumped in a pile lateral of the sod harvester 10 through the continued rotation of the conveyor belt 22. Once the scrap sod 17*c* on conveyor belt 22 has been dumped the pivotal sod gate 90 can be closed to again allow scrap sod to accumulate on the conveyor belt 22. In this example the shaft 92 on the hydraulic cylinder 92 can be extended or retracted by the operator, however, in some applications a sensor may be used to control the opening and closing of the sod gate 90.

Although an open chain link conveyor belt is shown other types of conveyor belts may be used without departing from the spirit and scope of the invention. While the invention has been described with respect to handling and transporting spoiled sod rolls within and through the frame of the sod harvester the invention may also be used to remove spoiled or unusable flat sod slabs within and through the frame of the sod harvester. As described herein the invention allows an operator to determine where and when the scrap sod should be discharged from the scrap sod carrier.

Figure 10:
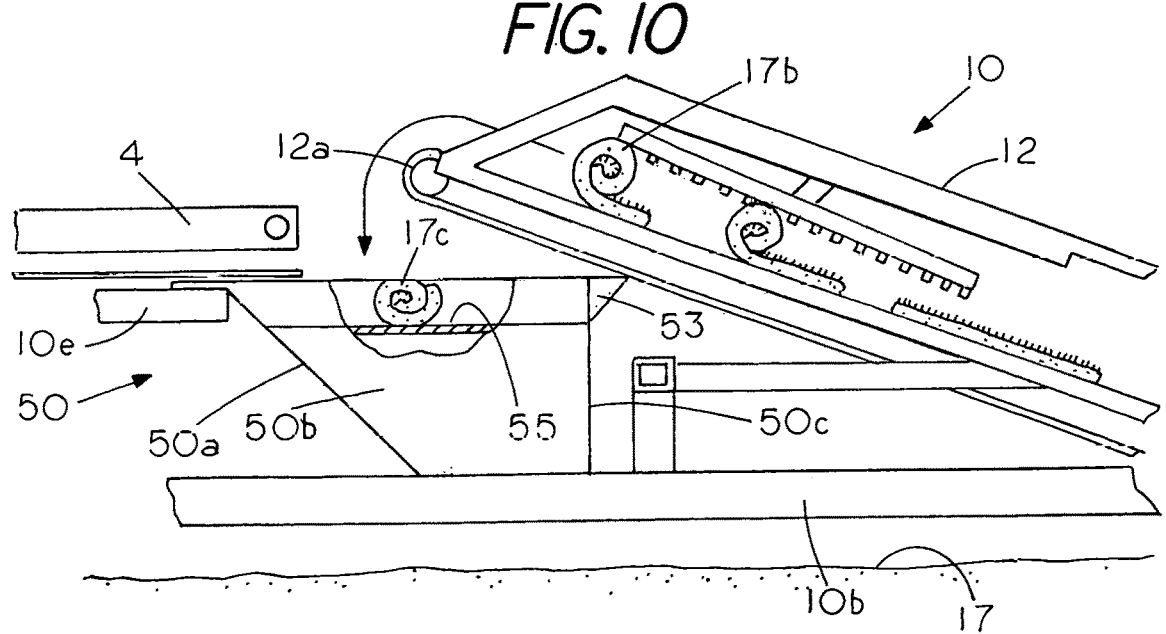
FIG. 10 is an isolated view of the sod harvester conveyor with the scrap sod carrier comprising a gravity chute as the sod conveyor carrier delivers a spoiled sod roll to the scrap sod carrier.

FIG. 10 is an isolated view of the sod harvester 10 showing an example of a scrap sod carrier 50 having a gravity chute 55 for transferring a scrap sod slab from one side of the harvester to the opposite side of the harvester as opposed to the scrap sod carrier 20 having a conveyor belt to transfer a scrap sod slab from one side of the harvester to the opposite side of the harvester. A top or input end of the gravity chute 55 is located beneath a fall line extending from the discharge end 12a of the sod conveyor 12 in order to receive a spoiled sod slab dropped from the sod conveyor 12. FIG. 10 shows the sod conveyor 12 delivering a spoiled sod roll 17c to the open top end of gravity chute 55, which is supported by sod harvester frame members 10b and 10e. In this example the spoiled sod roll 17c falls onto the gravity chute 55, which comprise a smooth floor that angles downward from the discharge end 12a of the conveyor that is located on one side of the sod harvester 10 to the discharge end of the gravity chute 55, which is located on the opposite side of the sod harvester 10. A feature of the gravity chute 55 is that the smooth and angled gravity chute 55 forms a slide that allows spoiled sod roll 17c to slide from the top end of the gravity chute 55 to the lower end of the gravity chute 55 in response to the gravitational force acting on the spoiled sod roll 17c and without use of external power.

Figure 11:
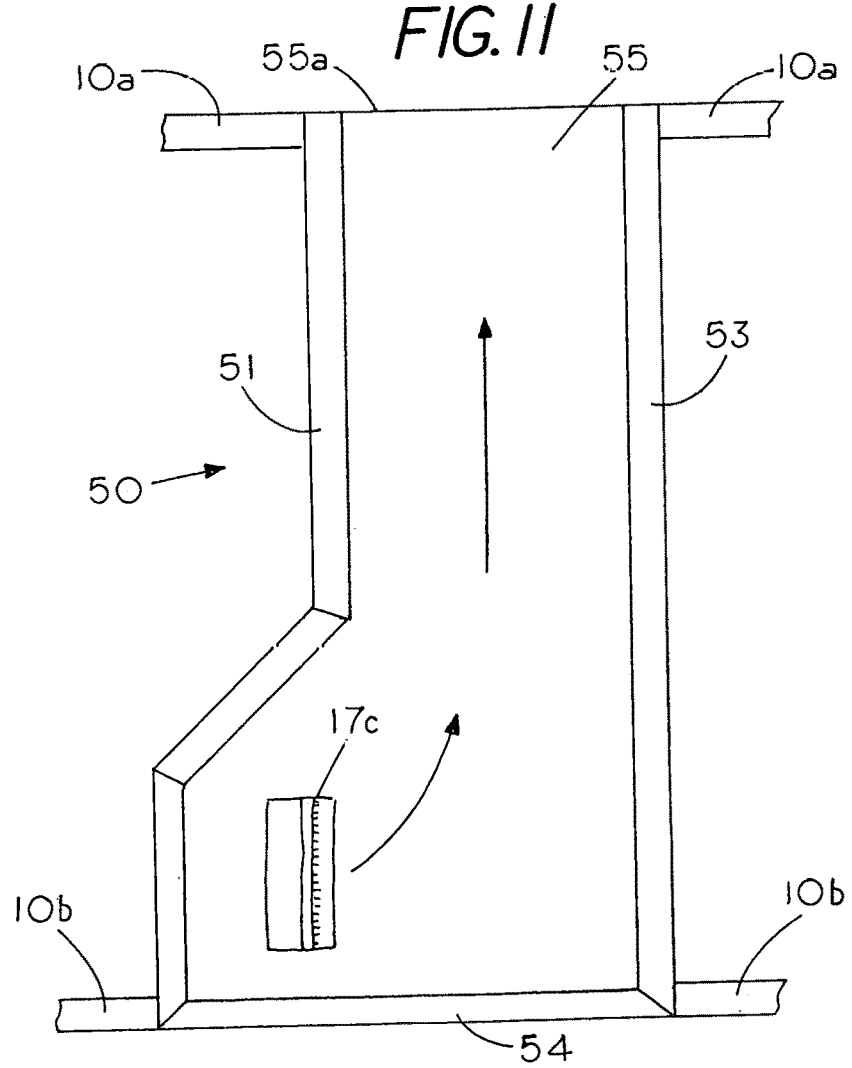
FIG. 11 is an isolated top view of the scrap sod carrier of FIG. 10.

FIG. 11 is a top isolated view of the scrap sod carrier 50 revealing the angled sidewalls 51, 54 and 53 that are joined to gravity chute 55 to form a trough for funneling spoiled sod roll 17c to a discharge end 55a of the gravity chute 55. Typically, gravity chute 55 may be a flat floor of sheet metal or the like, which provides low frictional sliding resistance to the spoiled sod roll 17c that falls thereon. The arrows indicate the sliding path of spoiled sod roll 17c as it slides from the higher elevation proximate one side of the sod harvester 10 to the lower elevation proximate the opposite side of the sod harvester 10. In this example the spoiled sod roll 17c slides along gravity chute 55 from the right side of the sod harvester 10b to the opposite side 10a of the sod harvester 10 and is subsequently discharged from end 55a of the gravity chute 55. A feature of the gravity chute 55 is that the chute can transfer the spoiled sod roll 17c from side to side of the sod harvester 10 all within the internal framework of sod harvester and without power to a position where the spoiled sod 17c can be discharged onto the sod field 12 where the spoiled sod 17c does not interfere with subsequent sod harvesting passes of the sod harvester. Thus one can transfer spoiled sod rolls 17c from side to side of the sod harvester 10 with either the scrap sod carrier that uses a conveyor belt or the scrap sod carrier that uses a gravity chute.

Figure 12:
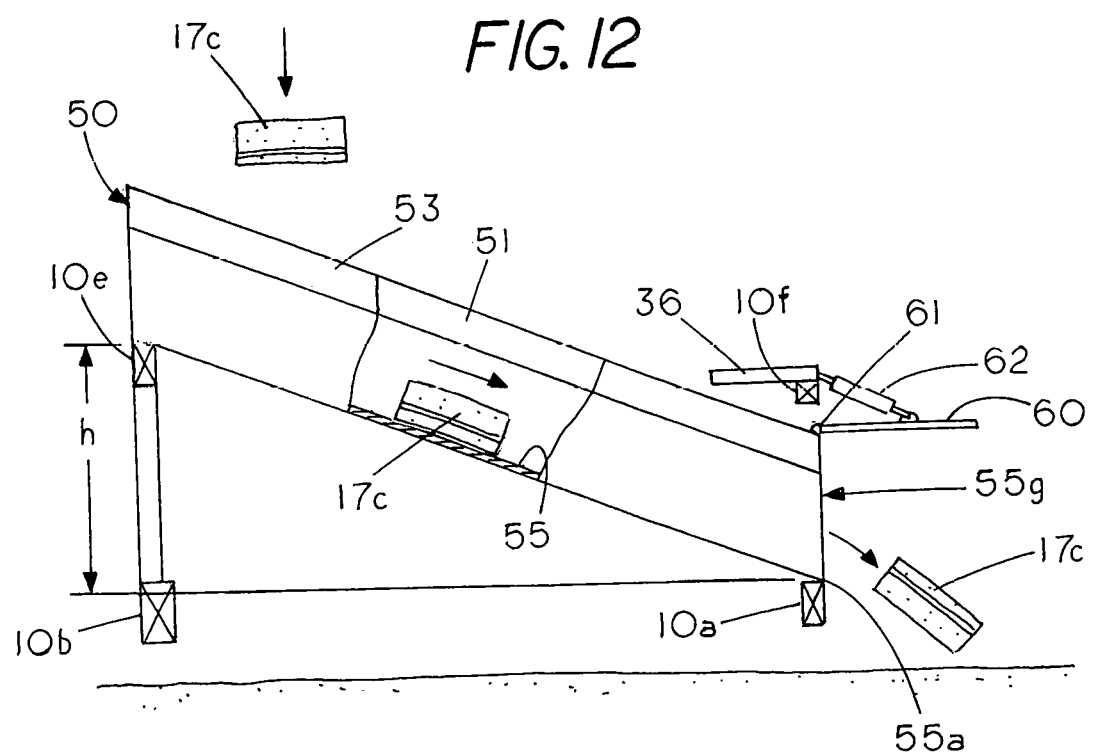
FIG. 12 is an isolated and partial sectional front view of the scrap sod carrier of FIG. 10.

FIG. 12 is an isolated and partial sectional front view of the scrap sod carrier 50, which is supported on one end by sod harvester frame 10b and the other end by sod harvester frame 10a. The difference in elevation between the discharge end 55a of the scrap sod carrier 50 and the upper input end of the scrap sod carrier 50 is indicated by "h" with the elevation difference from end to end such that gravity causes a spoiled sod roll 17c thereon to slide along chute 55 to the discharge end 55a of scrap sod carrier 50 where it is dropped on field 12.

While scrap sod carrier 50 may be used without a sod gate as illustrate in FIG. 11 one may want to use scrap sod carrier 50 with a sod gate 60, as illustrated in FIG. 12. In the embodiment of FIG. 12 the sod gate 60, which is shown in the open condition, allows spoiled sod roll 17c to slide out the end 55a of the gravity chute 55. A feature of the use of the sod gate 60 is that when the sod gate 60 is pivoted to the closed or vertical condition i.e. where the sod gate 60 extends across the open-end 55g the sod gate 60 prevents spoiled sod rolls 17c from being discharged from the gravity chute 55. This feature allows one to accumulate and hold spoiled sod rolls 17c in front of sod gate 60. One can then discharge the spoiled sod rolls 17c, which have accumulated in front of the sod gate 60, from the end of the chute 55 by pivoting the sod gate 60 about hinge 61 through a hydraulic cylinder 62, which may be manually controlled by the operator of the sod harvester. The spoiled sod rolls 17c can then be dumped in a pile for later removal.

I claim:

1. A sod harvester comprising:
    a sod slab conveyor for elevating a cut sod slab for discharge therefrom;
    a displaceable sod transport mechanism having a receiving position for receiving an unspoiled sod slab from a discharge end of the sod slab conveyor and a non receiving position to allow a spoiled sod slab to fall from the discharge end of the sod slab conveyor; and
    a scrap sod carrier extended transversely to the sod harvester for capturing and directing a spoiled sod slab laterally away from the sod harvester;
    a bang board located on first side of the scrap sod carrier to break the fall of the spoiled sod slab with the bang board located aft and below the discharge end of the sod slab conveyor so the spoiled sod slab falls into the scrap sod carrier after hitting the bang board; and
    an upward extending sidewall located on an opposite of the scrap sod carrier to prevent the spoiled sod slab from rolling off the scrap sod carrier.

2. The sod harvester of claim 1 wherein the scrap sod carrier includes a chain link conveyor belt.

3. The sod harvester of claim 2 including a hydraulic motor for driving the chain link conveyor belt.

4. The sod harvester of claim 3 including an operator control station for maintaining the spoiled sod slab in the scrap sod carrier or discharging the spoiled sod slab from the scrap sod conveyor.

5. The sod harvester of claim 1 wherein the scrap sod carrier is located within a framework of the sod harvester and extends laterally from side to side of the sod harvester.

6. The sod harvester of claim 1 wherein the scrap sod carrier includes a further sidewall located below the bang board to prevent the spoiled sod slab from falling off the scrap sod conveyer as the bang board funnels the spoiled sod slab forward into the scrap sod conveyer.

7. A sod harvester comprising:
    a sod conveyor for removing a spoiled sod slab or an unspoiled sod slab from a sod field;
    a further conveyor located aft of the sod conveyor to receiving an unspoiled sod slab;
    a transversely extending scrap sod carrier located underneath the sod conveyor for receiving a falling spoiled sod slab, said scrap sod carrier having a first angled sidewall located on one side of the scrap sod carrier and a second angled sidewall located on the opposite side of the scrap sod carrier to form a trough for carrying the falling spoiled sod slab laterally across the sod harvester before laterally discharging the fallen spoiled sod slab away from the sod harvesting harvester.

8. The sod harvester of claim 7 wherein the scrap sod carrier includes a first sidewall for directing the spoiled sod slab into the scrap sod carrier and a second sidewall each having a height greater than the spoiled sod slab thereon for maintaining the spoiled sod slab on the scrap sod carrier before the spoiled sod slab is discharged from a discharge end of the scrap sod carrier.

9. The sod harvester of claim 8 wherein the scrap sod carrier is located within a framework of the sod harvester and the scrap sod carrier includes an open chain link conveyor belt.

10. The sod-harvester of claim 7 wherein the scrap sod carrier comprises a smooth gravity chute that allows the fallen sod slab to slide to an end of the gravity chute.

11. The sod harvester of claim 7 wherein the scrap sod carrier includes a sod gate to prevent discharge of the fallen sod slab from the scrap sod carrier.

12. The sod harvester of claim 8 wherein the first sidewall includes a bang board located at an acute angle with a horizon.

13. The sod harvester of claim 8 wherein the first sidewall extends transversely to the sod harvester with the first sidewall spaced rearward from a sod slab fall line extending from the discharge end of the sod conveyor.

14. A method of on-the-go isolation of scrap sod during sod harvesting comprising:
cutting and elevating a plurality of sod slabs from a sod field with a sod harvester;
directing an unspoiled sod slab from the plurality of sod slabs to a sod transfer mechanism in the sod harvester;
periodically separating a scrap sod slab from the plurality of sod slabs by dropping the scrap sod slab onto a transversely extending scrap sod carrier having a pair of sidewalls for located within the sod harvester to form a trough therebetween; and
moving the scrap sod slab from side to side of the sod harvester on the scrap sod carrier as the pair of sidewalls retain the scrap sod slab therebetween; and discharging the scrap sod slab laterally away from the sod harvester while the sod transfer mechanism moves the unspoiled sod slab sod through the sod harvester during a forward motion of the sod harvester.

15. The method of claim 14 including deflecting the scrap sod slab off a bang board into the transversely extending scrap sod carrier.

16. The method of claim 14 including forming each of the plurality of sod slabs into a plurality of sod rolls having a free end.

17. The method of claim 16 including dropping a scrap sod roll with the free end onto a bang board without unwinding the scrap sod roll.

18. The method of claim 16 including accumulating scrap sod rolls on a transversely extending conveyor.

19. The method of claim 18 including periodically activating a transversely extending scrap sod conveyor belt to deliver a scrap sod thereon to a collection site.

20. A sod harvester comprising:
an elevating sod conveyer with a sod cutting mechanism;
a sod slab conveyor having an end for discharging a spoiled sod slab therefrom;
a scrap sod carrier extending transversely to the sod harvester to receive the spoiled sod slab from the sod slab conveyor;
a bang board;
a first sidewall and the bang board located along one side of the scrap sod conveyor and a second sidewall located on an opposite side of the scrap sod conveyor to thereby retain the spoiled slab between the first sidewall and the second sod wall;
a sod gate located in the scrap sod carrier with the sod gate extending across an end of the scrap sod carrier to retain the spoiled sod slab on the scrap sod carrier with the sod gate moveable between a closed position where the gate prevents the spoiled sod slab from leaving the scrap sob carrier and an open position where the sod gate allows the spoiled sod slab to fall to the ground off an end of the sod scrap conveyor.

21. The sod harvester of claim 20 wherein the scrap sod carrier includes a conveyor belt to carry the spoiled sod slab to a field discharge end of the scrap sod carrier.

22. The sod harvester of claim 21 wherein the sod gate extends across the field discharge end of the scrap sod carrier to prevent discharge of the spoiled sod slab therefrom even though the conveyor belt continues to slide beneath the spoiled sod slab thereon.

23. The sod harvester of claim 22 where the sod gate is maintained in a closed condition as the conveyor belt moves underneath the spoiled sod slab to bring an additional spoiled sod slab toward the field discharge end of the scrap sod carrier.

24. The sod harvester of claim 22 wherein the sod gate is pivotable from a closed condition to an open condition to allow the spoiled sod slab and the additional spoiled sod slab to be dumped in a pile lateral of the sod harvester.

25. The sod harvest of claim 24 wherein a continued rotation of the conveyor belt dumps the spoiled sod slab in the pile lateral of the sod harvester.

26. The sod harvester of claim 22 including a hydraulic cylinder for opening and closing the sod gate.

27. The sod harvester of claim 22 wherein the conveyor belt comprises either a chain link conveyor belt or a continuous flexible belt each having a frictional surface sufficient to pull the spoiled sod slab toward the field discharge end of the scrap sod carrier while allowing the conveyor belt to slide beneath the spoiled sod slab when the spoiled sod slab encounters the sod gate.

28. The sod harvester of claim 20 wherein the scrap sod carrier includes a gravity chute for sliding a spoiled sod slab to a discharge end of the scrap sod carrier.

* * * * *